US006873293B2

(12) United States Patent
Proctor, Jr. et al.

(10) Patent No.: US 6,873,293 B2
(45) Date of Patent: Mar. 29, 2005

(54) ADAPTIVE RECEIVE AND OMNIDIRECTIONAL TRANSMIT ANTENNA ARRAY

(75) Inventors: James A. Proctor, Jr., Melbourne Beach, FL (US); Bing Chiang, Melbourne, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

(21) Appl. No.: 10/386,393

(22) Filed: Mar. 10, 2003

(65) Prior Publication Data

US 2004/0150569 A1 Aug. 5, 2004

(Under 37 CFR 1.47)

Related U.S. Application Data

(60) Provisional application No. 60/363,144, filed on Mar. 8, 2002.

(51) Int. Cl.[7] .................................................. H01Q 1/24
(52) U.S. Cl. .................... 343/702; 343/725; 343/834
(58) Field of Search ............................... 343/702, 725, 343/814, 815, 833, 834, 836, 837, 853

(56) References Cited

U.S. PATENT DOCUMENTS

| 3,846,799 | A | | 11/1974 | Gueguen |
| 3,972,044 | A | * | 7/1976 | Alford ........................ 342/406 |
| 5,231,413 | A | * | 7/1993 | Dubois ........................ 343/833 |
| 5,313,660 | A | | 5/1994 | Lindenmeier et al. |
| 5,629,713 | A | * | 5/1997 | Mailandt et al. ............ 343/808 |
| 5,905,473 | A | | 5/1999 | Taenzer |
| 5,936,583 | A | | 8/1999 | Sekine et al. |
| 5,940,044 | A | | 8/1999 | Smith |

(Continued)

OTHER PUBLICATIONS

Ohira and Gyoda, "Electronically Steerable Passive Array Radiator Antennas for Low–Cost Analog Adaptive Beamforming,"0–7803–6345–0/00, 2000 IEEE.

(Continued)

*Primary Examiner*—Tho Phan
(74) *Attorney, Agent, or Firm*—Hamilton, Brook, Smith & Reynolds, P.C.

(57) ABSTRACT

An adaptive antenna used in a receive only mode with a separate omnidirectional transmit antenna. The arrangement is especially effective for small, handheld wireless devices. The transmit antenna maybe integrated with the receive array by utilizing a horizontally polarized transmit and vertically polarized receiver ray. In other embodiments, the transmit antenna may be physically separate and not integrated with the receive array. In either case there is separate receive and transmit signal port as an interface to radio transceiver equipment. The use of an adaptive antenna in the receive only direction has the potential to increase forward links capacity to levels equal to or greater than reverse link capacity. This allows for a significant increase in the overall number of users that may be active at the same time in a wireless system.

19 Claims, 10 Drawing Sheets

U.S. PATENT DOCUMENTS

| | | | |
|---|---|---|---|
| 6,040,803 A | | 3/2000 | Spall |
| 6,049,310 A | * | 4/2000 | Sadahiro .................... 343/702 |
| 6,167,039 A | | 12/2000 | Karlsson et al. |
| 6,184,836 B1 | | 2/2001 | Ali |
| 6,198,442 B1 | | 3/2001 | Rutkowski et al. |
| 6,204,826 B1 | | 3/2001 | Rutkowski et al. |
| 6,225,951 B1 | | 5/2001 | Holshouser et al. |
| 6,268,831 B1 | | 7/2001 | Sanford |
| 6,483,470 B1 | * | 11/2002 | Hohnstein et al. .......... 343/721 |
| 6,496,152 B2 | | 12/2002 | Nilsson |
| 6,498,804 B1 | | 12/2002 | Ide et al. |
| 6,501,943 B1 | | 12/2002 | Ide et al. |
| 6,515,635 B2 | * | 2/2003 | Chiang et al. .............. 343/834 |
| 2002/0113743 A1 | * | 8/2002 | Judd et al. .................. 343/757 |

OTHER PUBLICATIONS

Scott, et al., "Diversity Gain from a Single–Port Adaptive Antenna Using Switched Parasitic Elements Illustrated with a Wire and Monopole Prototype," IEEE Transactions on Antennas and Propagation, vol. 47, No. 6, Jun. 1999.

King, Ronold W.P., *The Theory of Linear Antennas*, pp. 635–637, Harvard University Press, Cambridge, Mass., 1956.

Preston, Stephanie L. et al., "Base–Station Tracking in Mobile Communications Using a Switched Parasitic Antenna Array," *IEEE Transactions on Antennas and Propagation*, 46(6):841–844 (1998).

* cited by examiner

ADAPTIVE RECEIVE AND OMNIDIRECTIONAL TRANSMIT ANTENNA ARRAY

RELATED APPLICATIONS

This application claims the benefit of U.S. Provisional Application No. 60/363,144, filed Mar. 8, 2002. The entire teachings of the above application are incorporated herein by reference.

FIELD OF THE INVENTION

This invention relates to wireless communication systems and in particular to a compact, configurable antenna apparatus for use with a portable subscriber unit.

BACKGROUND OF THE INVENTION

Code Division Multiple Access (CDMA) modulation and other spread spectrum techniques now find widespread application in wireless systems such as cellular mobile telephones, wireless local area networks and similar systems. In these systems a connection is provided between a central hub or base station and one or more mobile or remote subscriber units. The base station typically includes a specialized antenna for sending forward link radio signals to the mobile subscriber units and for receiving reverse link radio signals transmitted from the mobile units. Each mobile subscriber unit also contains its own antenna, for the reception of the forward link signals and for transmission of reverse link signals. A typical mobile subscriber unit may for example, be a digital cellular telephone handset or a personal digital assistant having an incorporated cellular modem, or other wireless data device. In CDMA systems, multiple mobile subscriber units are typically transmitting and receiving signals on the same carrier frequency at the same time. Unique modulation codes distinguish the signals originating from or intended to be sent to individual subscriber units.

Other wireless access techniques also use spread spectrum for communications between a centralized unit and one or more remote or mobile units. These include the local area network standard promulgated by the Institute of the Electrical and Electronic Engineers (IEEE) 802.11 and the industry developed wireless Bluetooth standard.

The most common antenna used in a mobile subscriber unit is a monopole. A monopole antenna most often consists of a single wire or other elongated metallic element. A signal transmitted from such a monopole antenna is generally omnidirectional in nature. That is, the signal is sent with approximately the same signal power in all directions in a generally horizontal plane. Reception of a signal with a monopole antenna element is likewise omnidirectional. A monopole antenna therefore cannot differentiate between signals originating from one direction versus a different signal originating from another direction. Although most monopole antennas do not produce significant radiation in the elevation plane, the expected antenna pattern in three dimensions is typically a donut-like toroidal shape, with the antenna element located at the center of the donut hole.

Unfortunately, CDMA communication systems are typically interference limited. That is, as more and more subscriber units become active within a particular area and share access to the same base station, interference increases among them, and thus so does the bit error rate they experience. To maintain system integrity in the face of increasing error rates, often the maximum data rate available to one or more users must be decreased, or the number of active units must be limited in order to clear the radio spectrum.

It is possible to eliminate excessive interference by using directive antenna at either the base station and/or the mobile units. Typically, a directive antenna beam pattern is achieved through the use of a phased array antenna at the base station. The phased array is electronically scanned or steered desired direction by controlling the phase angle of a signal input to each antenna element.

However, phased array antennas suffer decreased efficiency and gain as elements become electrically small as compared to the wavelength of the radiated signals. When phased arrays are used or attempted to be used in conjunction with a hand-held portable subscriber unit, the antenna array spacing must be relatively small and therefore antenna performance is correspondingly compromised.

SUMMARY OF THE INVENTION

Several considerations should be taken into account when designing an antenna for a hand-held wireless device. For example, careful consideration should be given to the electrical characteristics of the antenna so that propagating signals satisfy predetermined standards requirements such as, for example, bit error rate, signal to noise ratio or signal to noise plus interference ratio.

The antenna should also exhibit certain mechanical characteristics to satisfy the needs of a typical user. For example, the physical length of each element of the antenna array depends upon the transmit and receive signal frequency. If the antenna is configured as monopole, the length is typically a quarter length of a signal frequency; for operation at 800 MegaHertz (MHz) (one of the more popular wireless frequency bands) a quarter wavelength monopole must typically be in the range 3.7" long.

The antenna should furthermore present an esthetically pleasing appearance. Especially when used in a mobile or handheld portable unit, the whole device must remain relatively small and light with a shape that allows it to be easily carried. The antenna therefore must be mechanically simple and reliable.

In CDMA systems in particular, another consideration involves controlling the capacity of the overall network. Some have provided for adaptive antenna arrays for use on a reverse link of a CDMA system in a handset. These directional antenna arrays can be used to increase system performance by decreasing interference from surrounding base-stations and/or other handsets. However, employing directional antennas on the reverse link complicates the performance of power control systems. That is, as in most wireless communication systems, the power level of signals radiated from handsets must be carefully controlled in order to avoid interference to other handsets so that the signal powers arrive at the base or other central site within a known power level range.

The present invention comes about from realizing the advantages of a mobile-subscriber device that uses a directional or other adaptive antenna array together with a separate transmit antenna. The directional adaptive antenna array, which is used only to receive signals, may typically consist of a number, N, of monopole antenna elements. These monopole elements can be formed as conductive segments on a portion of a dielectric substrate such as a printed circuit board. To complete the array, at least one element is designated as an active antenna element which is also disposed on the same substrate as one or more passive elements. In a preferred embodiment, the active element is disposed in the center of the array and the number of passive elements is two.

The separate transmit antenna may be integrated with the receive array. In a preferred embodiment, the transmit antenna is an omnidirectional element.

In other embodiments, the transmit antenna may be physically separated such as on the opposite side of the housing. That is, the receiver array may be positioned on the top of the handset with the transmit antenna on the lower portion thereof. In either case there is a separate receive and transmit interface port to the two antennas.

By utilizing a horizontally polarized transmit and vertically polarized receive array, isolation between the two antennae is improved.

CDMA based systems that exist today, such as IS-95 and IS-2000, have a capacity limitation problem. The limitations largely occur on the forward link, and result from some channel interference. This interference originates from both adjacent cells as well as from users within the same cell. Indeed, the difference in capacity between the forward and reverse links can be estimated to be as high as 50 to 100%. For voice and circuit switched data systems, the number of users that can be simultaneously supported is defined by the less capacious of the two links. Therefore, the limitation on the forward link actually limits the total number of users, and the excess capacity of the reverse link is wasted.

The use of an adaptive antenna in the subscriber unit on the receive side has the potential to increase the forward capacity to levels equal to or greater than the reverse capacity. This allows for a significant increase in the overall number of users without directly increasing the reverse capacity.

It is also envisioned that other types of systems, such as Time Division Duplex (TDD) systems, may also advantageously use the adaptive array for receive but to steer in an omnidirectional mode during transmit periods. The effect is achieves a similar result. It is also expected that when TDD systems are in a stationary or slow moving environment, a directional transmit may also be able to be utilized.

In accordance with its key aspects, the present invention consists of an antenna system in which an adaptive array is used for receiving signals and an omnidirectional antenna is used for transmitting. In preferred embodiments, the adaptive antenna is integrated into the housing of a handheld wireless communication unit, such as a mobile telephone unit, personal digital assistant or the like.

The adaptive array used for receive mode is preferably an array that uses parasitic, passive elements to achieve directionality.

In further aspects, the omnidirectional transmit antenna is physically and/or electrically separated from the receiver array. The omnidirectional transmit antenna may be integrated at a different polarity. For example, a vertically polarized receive array may have a horizontally polarized transmit element. In other instances, the separation can be provided by a physical distance such as by integrating the transmit antenna and the base of a handheld telephone unit.

The exact type of Radio Frequency (RF) modulation associated with the invention may be of many different types. For example, the invention can be utilized in Code Division Multiple Access (CDMA) systems as well as other Orthogonal Frequency Division Multiplexing (OFDM) or spread spectrum systems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
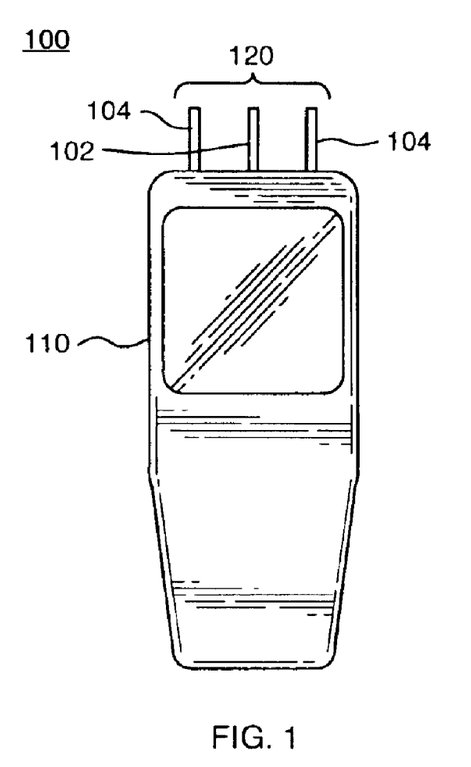
FIG. 1 is a high level schematic diagram of a wireless communication device incorporating an adaptive antenna array.

Turning attention now to the drawings, FIG. 1 illustrates a wireless device 100 that consists of a housing 110 having incorporated therein an antenna array 120. In general the device 100 is some form of wireless communications device, such as a cellular mobile handset, or a personal digital assistant such as a Palm Pilot.

The antenna array 100 provides for directional reception of forward link radio signals. The forward link signals may be transmitted from a base station, in the case of a cellular handset 100, or from a access point, in the case of a wireless data unit 100 making use of wireless local area network (WLAN) protocols. By directively receiving signals originating more or less from the location of a particular base station and/or access point, the antenna array 120 assists in reducing the overall effect of intercell interference and multipath fading for the mobile unit 100. Moreover, as will be understood shortly, since antenna beam patterns generated by the antenna array extend outward in a desired direction, but are attenuated in most other directions, less power is required for effective transmission by the base station.

In an example embodiment, the antenna array 120 consists of a center element 102 and a pair of passive elements 104, one on each side thereof. As will be understood shortly, the passive elements 104 can each be operated in either a reflective or directive mode; it is through this expediency that the array 120 can be steered to a particular direction. Although this embodiment shows three elements, it should be understood that the array 120 is not so limited, and that one, four, or even more passive elements may be included. Yet other embodiments are possible for the antenna array such as phased array, where the center element 102 is absent and the other elements are themselves used as active elements, together with active signal combining circuitry. We believe that a simple N passive element array is preferred, however, because of its low cost and high radiation efficiency.

Figure 2A:
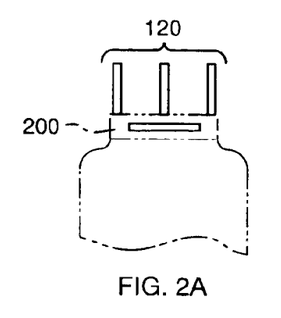
FIGS. 2A–2C show various arrangements in which a horizontally polarized, or predominantly horizontally polarized, omnidirectional transmit antenna is incorporated within the same device.
Figure 2B:
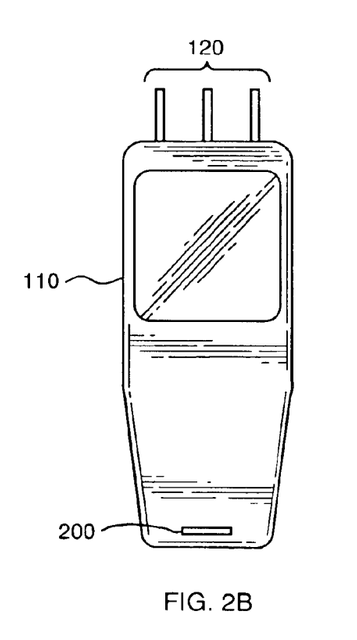
Figure 2C:
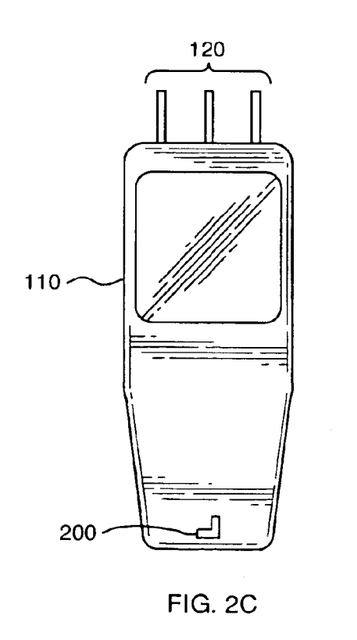

FIGS. 2A–2C illustrate various possible placements for a separate transmit antenna 200 in accordance with the present invention. In the embodiment shown in FIG. 2A, the transmit antenna 200 is placed on the same circuit board as the antenna array 120. In this particular embodiment, the transmit antenna 200 has a horizontal orientation as opposed to the vertically oriented elements of the receiver array 120. This orthogonal arrangement provides for greater isolation between the two antenna sets.

In an alternate embodiment shown in FIG. 2B, the transmit antenna 200 can be placed at the lower end of the handset 110 housing. This provides for even more electromagnetic isolation due to the physical distance between the horizontal element 200 and the elements of the receive array 120. This also tends to move a high power microwave region associated with the transmit antenna 200 closer to a region of the user's chin, rather than the user's brain.

In still other embodiments, as shown in FIG. 2C, an end portion of the transmit antenna 200 may be bent. The bent portion, which itself may then become more or less parallel with the elements of the directional array, allows for more design freedom. For example, this type of antenna can be used at a lower frequency where the overall length of the antenna must be longer but must still fit within the width of the handset. The bent element 200 might also be used to accommodate other components within the handset 110 such as a keypad. The bent arrangement also avoids radiation in the horizontal plane when the handset is held near a vertical position. This can provide for improved performance in all orientations of the handset 110.

Figure 3A:
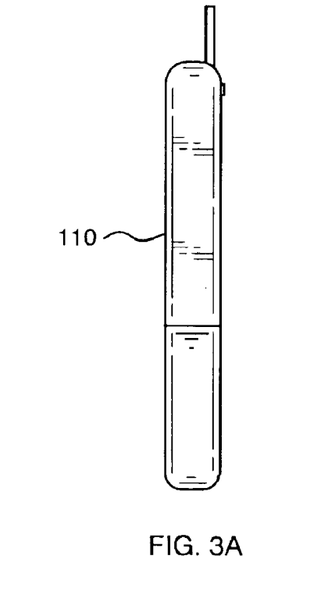
FIGS. 3A–3C illustrate an alternate embodiment for the transmit antenna, mounted on the backside of a handset.
Figure 3B:
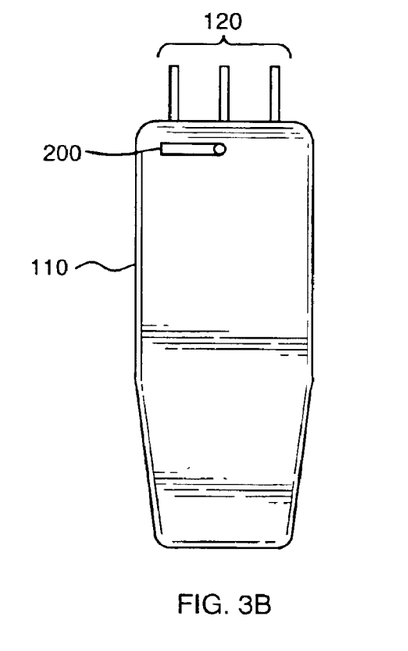
Figure 3C:
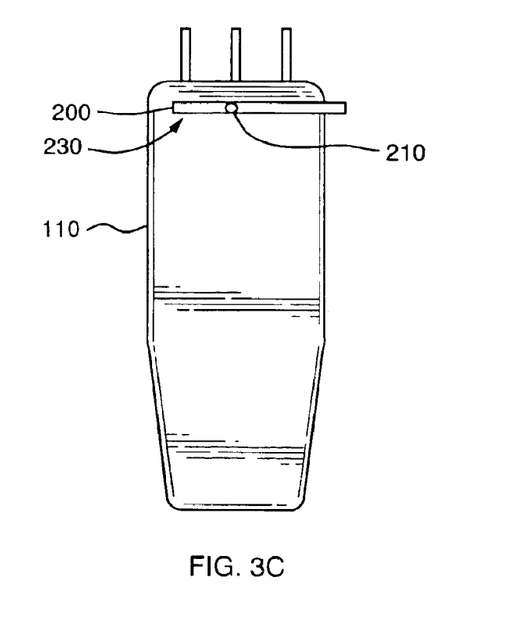

FIGS. 3A–3C show still further possible embodiments of the transmit element 200, with FIG. 3A being a side view and FIG. 3B being a rear view of the housing 110. Here the transmit antenna 200 is a relatively short length for operation at relatively high frequencies such as in Personal Communication Services (PCS) type frequencies that typically are in the range of 1900 MegaHertz (MHz). However the element 200 can be provided with a hinge 210 allowing for an elongated section 220 to provide dual mode operation. The overall length of the fully deployed antenna element can be made to resonate at a lower frequency, such as the 800 (MHz) frequency associated with standard cellular telephone communication. The hinged or flipping arrangement for the element 200 assures that it can either resonate within one band or the other. It is therefore preferred to sliding or telescoping arrangements which might lead to the user not fully deploying the element 200 at the proper length.

In this embodiment a feedpoint 230 associated with the transmit antenna 200 may actually be placed in an offset position that is not completely at one end of the element 200. This offset feedpoint location 230 allows the resonant length ratio to fit the 1900/800 MHz frequency ratio.

Figure 4:
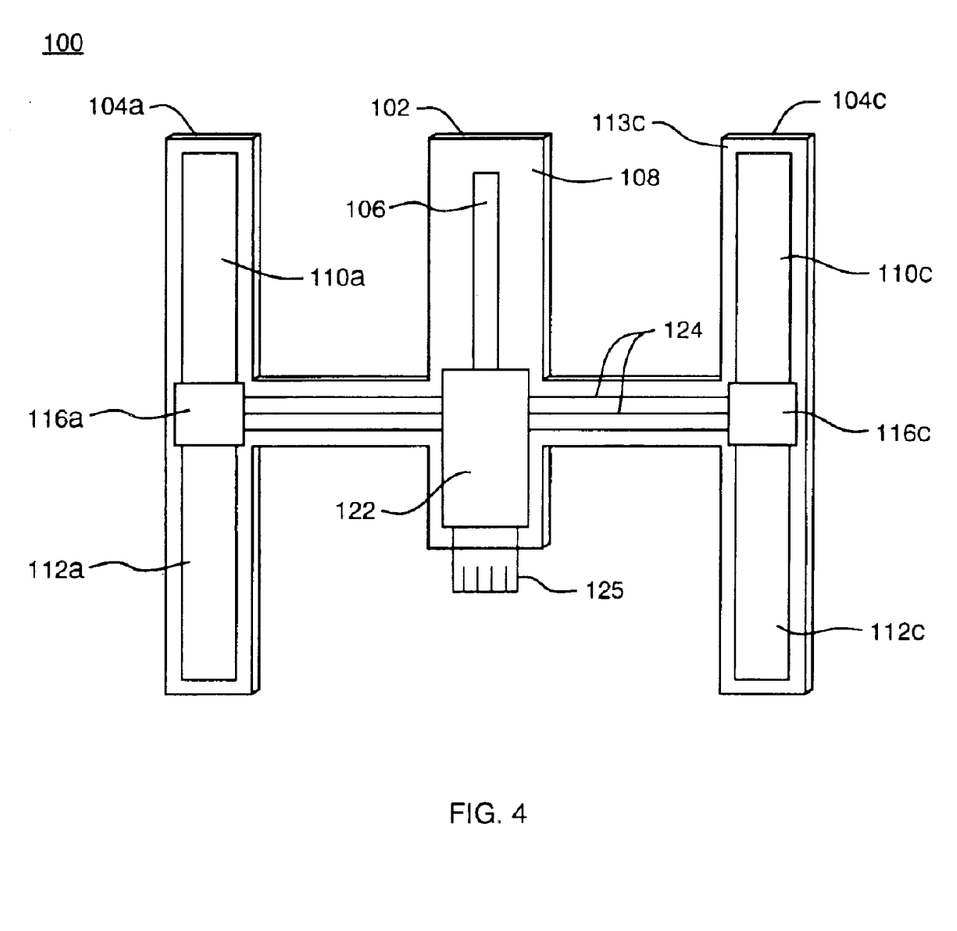
FIG. 4 is a more detailed plan of a three element receive array.

FIG. 4 is more detailed view of the adaptive directional array 110. Here the array 110 is disposed on portions of a dielectric substrate such as a printed circuit board, including the center element 102 and passive elements 104A and 104C previously described. Each of the passive elements 104 can be operated in a reflective or directive mode as will be understood shortly.

The center element 102 comprises a conductive radiator 106 disposed on the dielectric substrate 108. The passive elements 104A and 104C themselves each have an upper conductive segment 110A and 110C as well as a corresponding lower conductive segment 112A and 112C. These segments 110A, 110C, 112A, and 112C are also disposed on the dielectric substrate 108. The lower conductive segments 112A and 112C are in general grounded. Also, in general, the upper segments 110A and 110C and the lower 112A and 112C are of equal length.

When the upper conductive segment of one of the passive elements 104, for example the upper conductive segment 110A, is connected to the respective lower conductive segment 112A, the passive element 104A operates in a reflective mode. This results in received Radio Frequency (RF) energy being reflected back from the passive element 104A towards its source.

When the upper conductive segment 110A is open (i.e., not connected to the lower conductive segment 112A or other ground potential) the passive element 104A operates in a directive mode, in which the passive element 104A essentially is invisible to the propagating RF energy which passes therethrough.

In one embodiment, the center element 102 and the passive elements 104A and 104D are fabricated from a single dielectric substrate such a printed circuit board with the respective elements disposed thereon. The passive elements 104A and 104C can also be disposed on a deformable or flexible substrate or attached to one surface of the center element 102 as well.

A microelectronics module 122, including respective switch modules 116A and 116C, may also be disposed on the same substrate 108 with conductive traces 124 being provided therebetween. The signals carried on the conductive traces 124 control the state of the components within the microelectronic modules 116A and 116C that achieve particular operating states for the passive elements 104A and 104C, e.g., to place them in either the reflective or directive state as described above. Further connected to the microelectronics module 122 is an interface 125 for providing electrical signal control connectivity between the array 120 and an external controller device such as located in the remainder of the handset 100. Interface 125 can be constructed from either a rigid or flexible material such as ribbon cable or other connector, for example.

Figure 5:
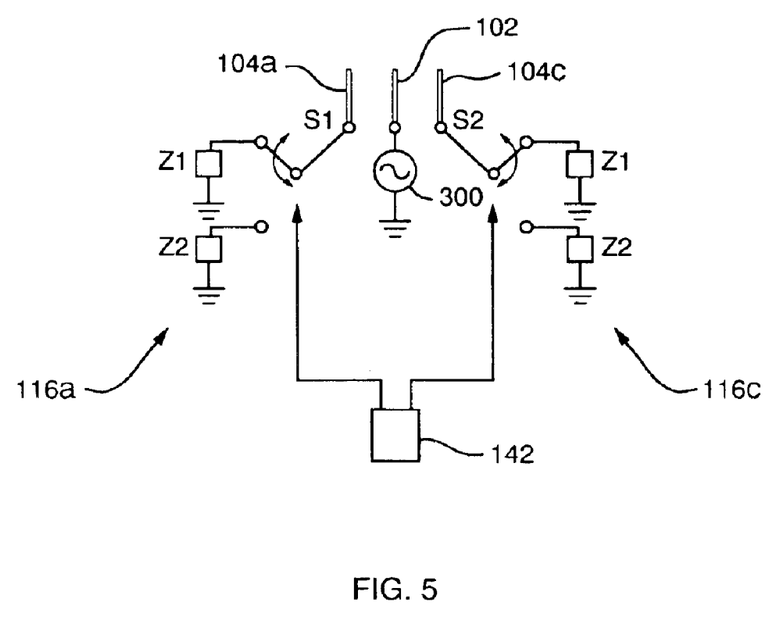
FIG. 5 is a circuit diagram showing one possible feed structure for the array.

FIG. 5 illustrates one possible feed structure for the array 120 in more detail. A switch control and driver 142 associated with the electronics module 122 provides logic control signals to each of the respective control modules 116A and 116C associated with the respective elements 104A and 104C. For example, each such control module 116 may have associated with it a switch S1 or S2 and two impedances Z1 and Z2. The state of the switches S1 or S2 provides for connection states of either connecting the first impedance Z1 or the second impedance Z2. In a preferred embodiment, the second impedance Z2 may be 0 ohms and the first impedance Z1 may be infinite, thus providing the desired short circuit to ground or open circuit. However, it should be understood that other values of the impedances Z1 and Z2 are possible, such as various reactive values.

Here it is also evident that the center element 102 is being directly driven to the receiver circuitry 300 associated with the handset. Thus, unlike other types of directive arrays, this particular directive array 120 has an advantage in that it is quite simple in operation, and complex combiners and the like are not necessary.

Figure 6:
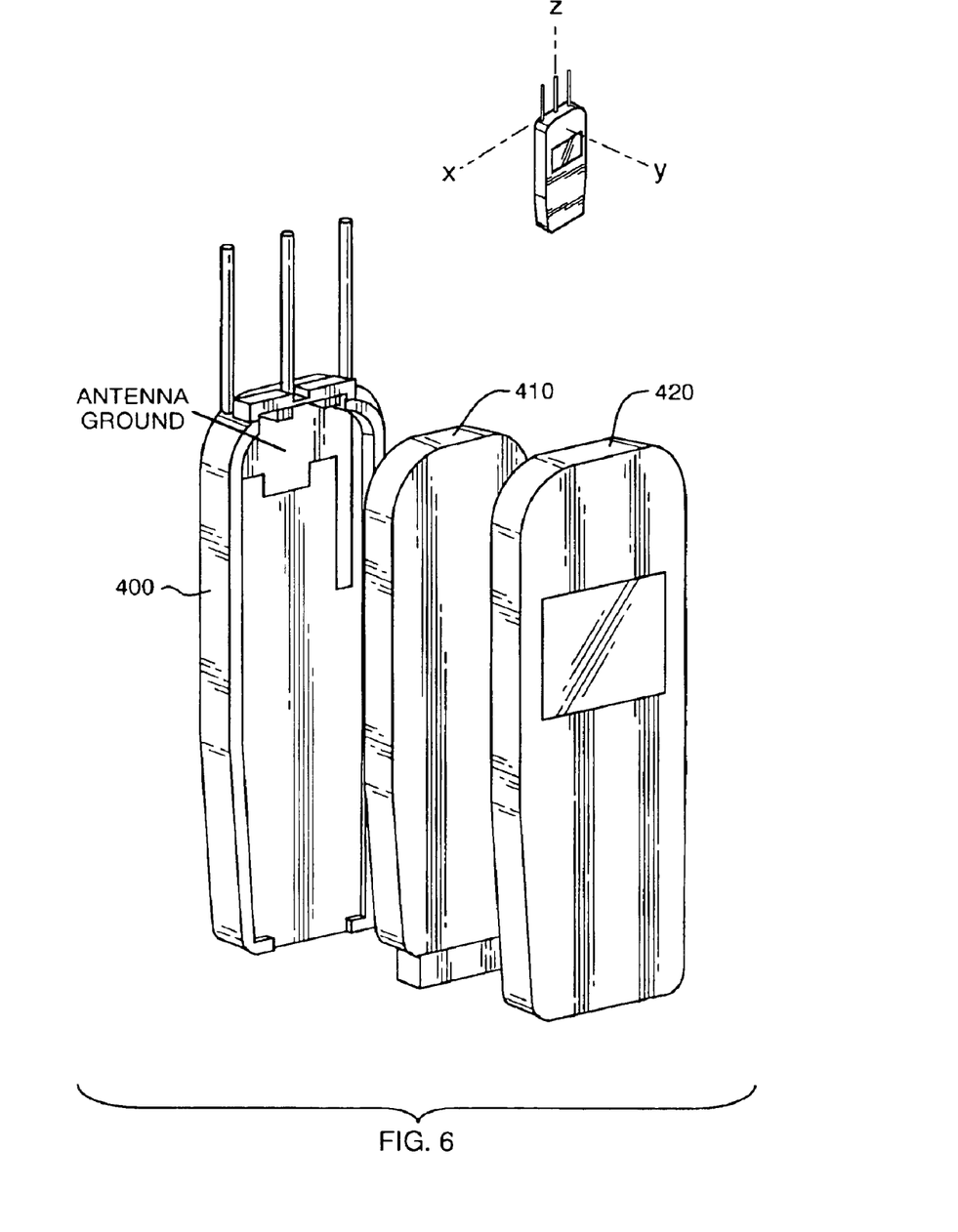
FIG. 6 is a schematic diagram illustrating how the array can be integrated into a handset.

FIG. 6 is a exploded view of one possible implementation showing the directive array 120 formed on a printed circuit board and placed within a rear cover of a handset, for example. A center module 410 may include electronic circuitry, radio reception and transmission equipment, and the like. A final module 420 may serve as, for example, a front cover of the device. What is important to see here is that the printed circuit board implementation of the 100 can be easily fit within a handset form factor.

Figure 7A:
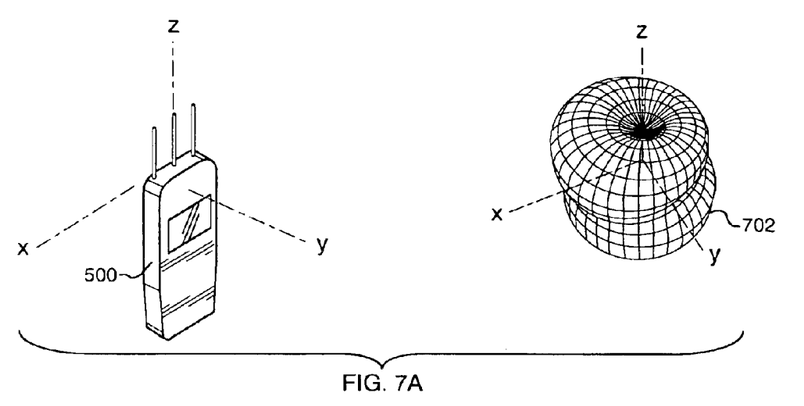
FIGS. 7A–7C illustrate a three-dimensional radiation pattern, azimuthal pattern and elevational pattern for the adaptive array.
Figure 7B:
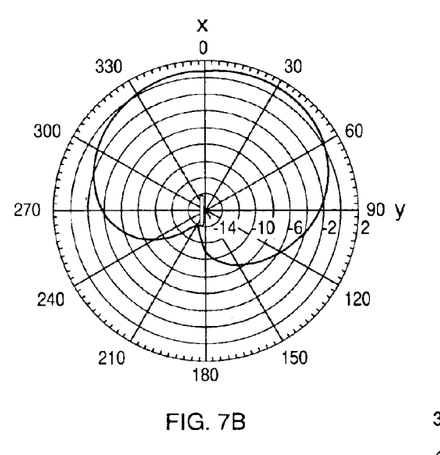

FIGS. 7A and 7B are antenna patterns illustrating performance of the array 120 as housed in a handset. The gain achievable is about 3 dBi. FIG. 7A is a three dimensional radiation pattern (in the X, Y and Z directions with respect to the referenced diagram shown for the handset 500).

FIG. 7B illustrates the azimuthal radiation pattern achievable when one of the elements is placed in directive mode and the other element is placed in reflective mode. The conducting element (which is made electrically longer in the Z direction), intercepts the received radio wave and reflects it. This creates a null in the negative X direction. Since there is no electromagnetic blockage in the +X direction, the wave passes through and creates a peak. The dimension of the circuit board in the X direction is not similar to the resonant wavelength, so that the signal is able to circulate all the way around the azimuthal plane.

Figure 7C:
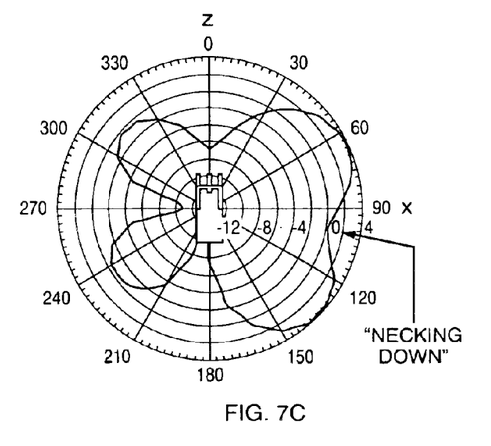

The pattern in FIG. 7C, an elevational pattern, should be compared to an ideal symmetrical pattern to illustrate the effect of the housing 110. The comparison shows that the overall effect on the azimuthal plane is a slight skewing of the beam, about 15° away from the X-axis. The pattern of FIG. 7C also illustrates "necking-down", which is an effect of placing the radiating element in a handset. Good directivity is seen, at least along an approximate 180° azimuthal plane, although skewing is evident.

Figure 8A:
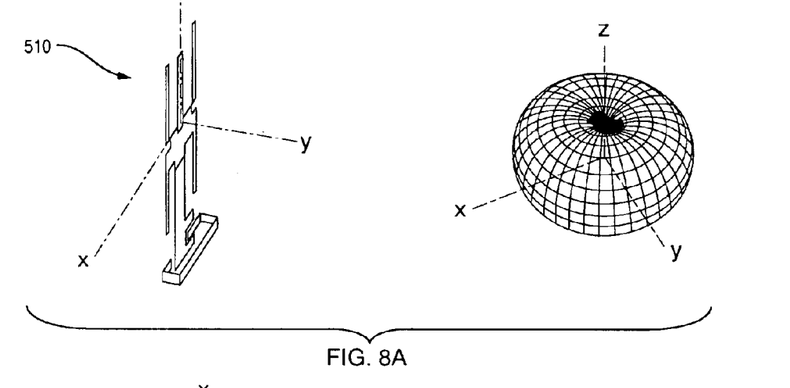
FIGS. 8A–8C illustrate the gain patterns of a horizontal monopole transmit element in the three-dimensional, azimuthal and elevational planes.
Figure 8B:
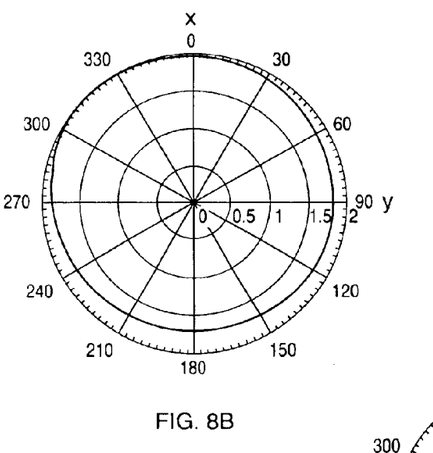
Figure 8C:
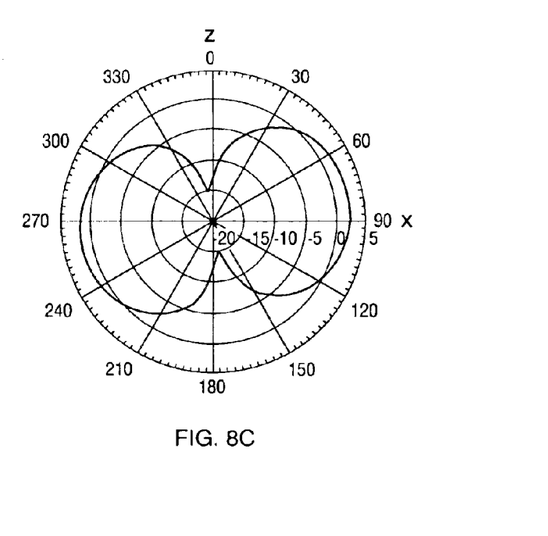

FIGS. 8A–8C are similar to FIGS. 7A–7C, although illustrate patterns the horizontal transmit antenna element 200. This particular embodiment, with the reference physical drawing 510 shown in the upper left hand corner, was for a bent horizontal monopole element. The gain pattern in three-dimensions is relatively uniform, as shown in FIG. 8C. The radiation pattern approaches a symmetric toroid with a gain of approximately 2.1 dBi. Again, the radiation pattern is offset somewhat through the effects of the handset enclosure 110. However, relatively omnidirectional performances, other than in the azimuthal plane (as shown in FIG. 8B) is the overall desired effect.

Figure 9A:
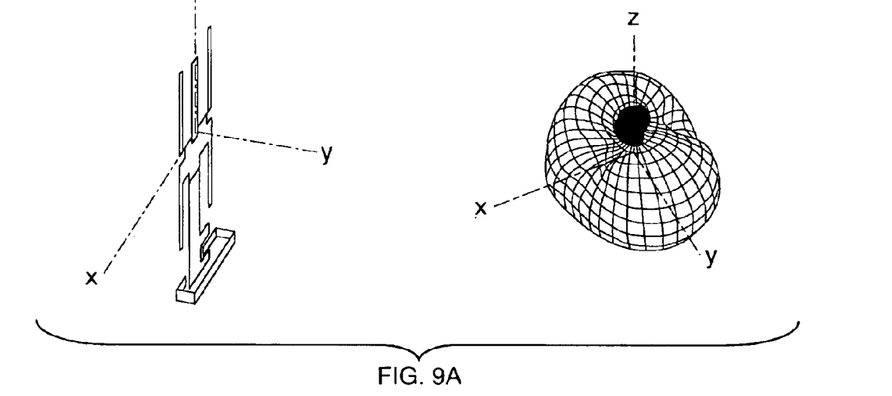
FIGS. 9A–9C illustrate gain patterns of the bent horizontal monopole element operating in a PCS radio frequency band.
Figure 9B:
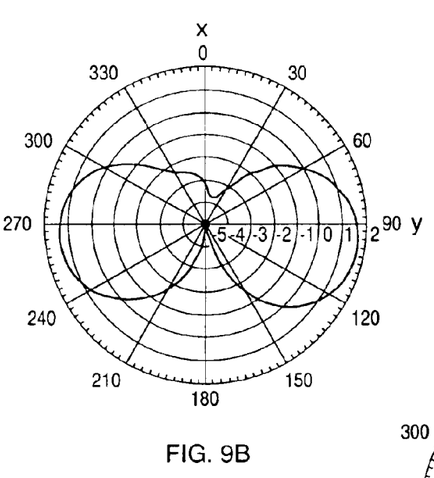
Figure 9C:
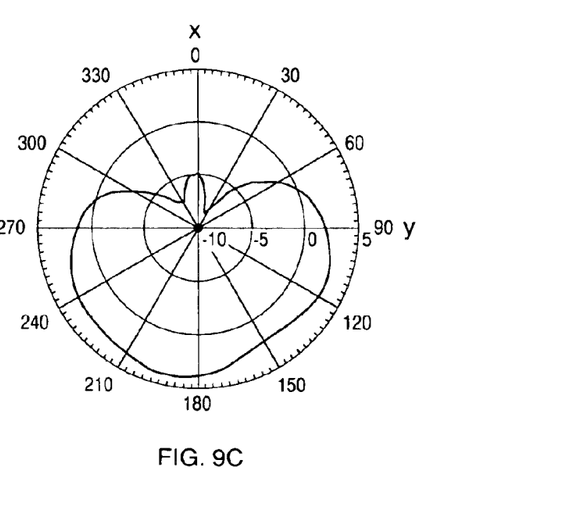

FIGS. 9A–9C are simulated gain patterns of a bent horizontal monopole designed for the 800 MHz cellular band, but operating in the higher frequency PCS band. The radiation pattern, as is evident from the view of FIG. 9A, is a cut toroid standing its "uncut" side. The gain is 4.2 dBi. The antenna is evidently radiating at its higher order mode, but is radiating effectively and thus can be used as a PCS radiator at 1900 MHz. As evident from FIGS. 9B and 9C, as at least some useable radiation pattern is seen in the azimuthal direction.

Figure 10A:
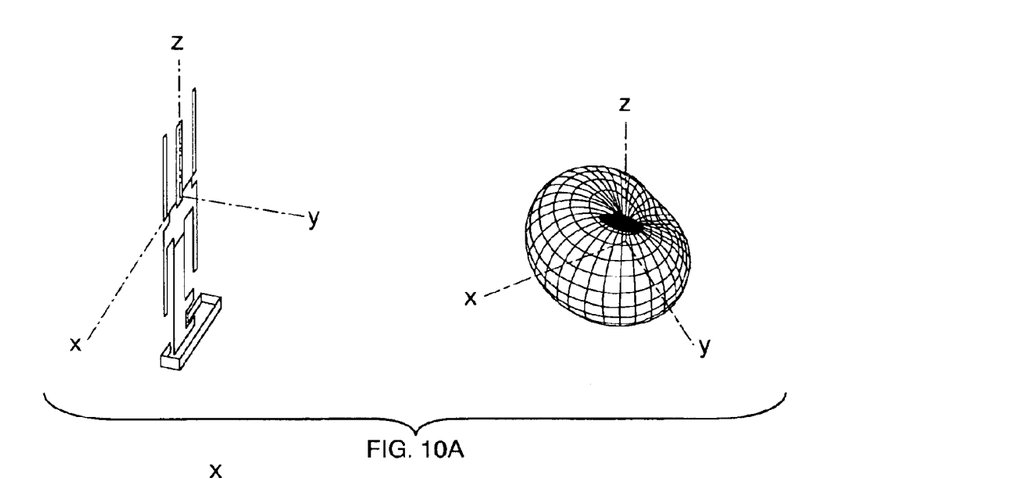
FIGS. 10A–10C illustrate three-dimensional, azimuthal, and elevational patterns for a bent monopole transmit element and its affect on the receive array.
Figure 10B:
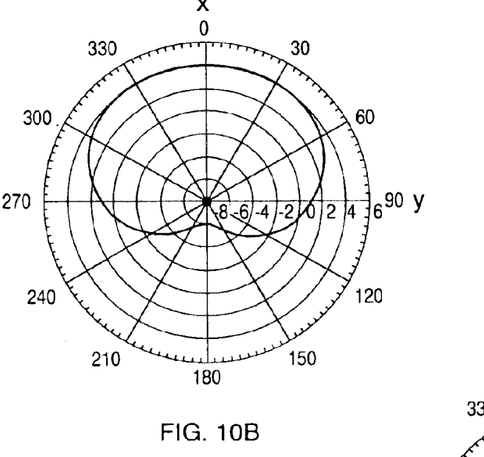
Figure 10C:
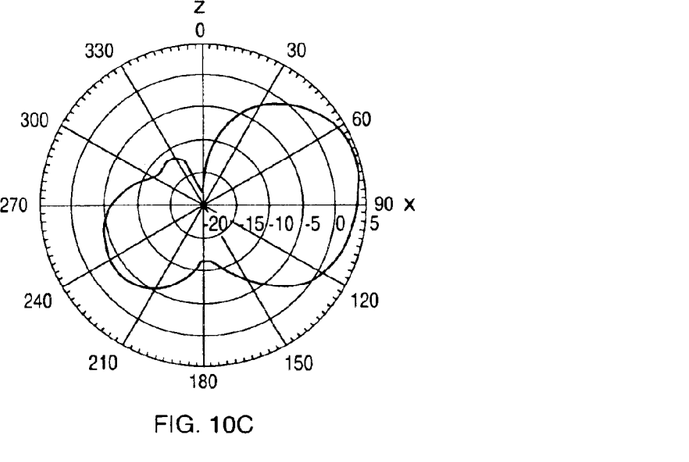

Finally, FIGS. 10A–10C illustrate the effect of adding a bent monopole together with the array 120 through a simulation process. In this simulation, a horizontal bent monopole 200 and the extending ground strip were added to the antenna array 120; only slight distortions were found. The beam is tilted upward by 15° (as shown in the elevational plot of FIG. 10C). The gain provided is 4.7 dBi with a beamwidth of 145° in the azimuthal plane. This illustrates that the bent monopole does not appreciably affect the operation of the array in the directional modes.

While this invention has been particularly shown and described with references to preferred embodiments thereof, it will be understood by those skilled in the art that various changes in form and details may be made therein without departing from the scope of the invention encompassed by the appended claims.

What is claimed is:

1. An adaptive antenna array intended for use in a mobile communication device comprising:
    an adaptive directional receive antenna array for signal reception; and
    an omnidirectional transmit antenna for signal transmission;
    the adaptive directional receive antenna array and the transmit antenna being integrated into a housing of a hand portable device.

2. A device as in claim 1 wherein the adaptive receive array comprises at least one parasitic element.

3. A device as in claim 1 wherein the transmit antenna comprises a radiating element disposed at a different polarization with respect to at least one of a plurality of elements of the receive array.

4. A device as in claim 3 wherein the receive array is vertically polarized and the transmit antenna is horizontally polarized.

5. A device as in claim 3 wherein the transmit antenna polarization is orthogonal to receive array polarization.

6. A device as in claim 1 wherein the omnidirectional transmit antenna is physically separated from the receive array.

7. A device as in claim 1 wherein the mobile communication device is used with Time-Division Duplex system, whereby the array is used during transmit time periods be forced to operate in a directive mode during at least some of a receive time period.

8. A device as in claim 1 wherein the device uses a Code Division Multiple Access modulation.

9. A device as in claim 1 wherein an Orthogonal Frequency Division Multiplex modulation is used.

10. A device as in claim 1 wherein the omnidirectional transmit antenna and the adaptive receive antenna array are integrated on a single dielectric substrate.

11. A device as in claim 1 wherein the omnidirectional transmit antenna is located at a base of the housing of the hand portable device and the receive array is located in a top portion of the housing.

12. A device as in claim 1 wherein the omnidirectional transmit antenna and the receive array are both located in a top portion of the housing of the handheld portable device.

13. A device as in claim 1 wherein the omnidirectional transmit antenna is bent.

14. A device as in claim 1 wherein the omnidirectional transmit antenna is attached to a rear portion of the housing.

15. A device as in claim 14 whererin the omnidirectional transmit antenna includes a hinge for extending and retracting a length of the transmit antenna.

16. A device as in claim 1 wherein the adaptive directional receive antenna array comprises an active antenna element and at least one passive antenna element.

17. A device as in claim 16 comprising a switch for coupling the at least one passive antenna element to one or more impedances in order to affect the directivity of the the adaptive directional receive antenna array.

18. A device as in claim 1 wherein a portion of the adaptive directional receive antenna array extends through the housing of the hand portable device.

19. An adaptive antenna array intended for use in a mobile communication device comprising:

an adantive directional receive antenna array for signal reception; and an omnidirectional transmit antenna for signal transmission, the omnidirectional transmit antenna being physically separated from the receive array. the omnidirectional transmit antenna being located at the base of a handheld unit where the receive array is located in a top portion.

* * * * *

UNITED STATES PATENT AND TRADEMARK OFFICE
CERTIFICATE OF CORRECTION

PATENT NO.   : 6,873,293 B2
DATED        : March 29, 2003
INVENTOR(S)  : James A. Proctor, Jr. and Bing Chiang It is certified that error appears in the above-identified patent and that said Letters Patent is hereby corrected as shown below:

<u>Column 10,</u>
Line 12, delete the second occurrence of "the".

Signed and Sealed this

Thirty-first Day of May, 2005

JON W. DUDAS
*Director of the United States Patent and Trademark Office*